(12) United States Patent
Mader (10) Patent No.: US 9,567,793 B2
(45) Date of Patent: Feb. 14, 2017

(54) METHOD FOR CONVEYING INSULATION GLASS BLANKS

(71) Applicant: LISEC AUSTRIA GMBH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 14/784,526

(22) PCT Filed: Jan. 26, 2015

(86) PCT No.: PCT/AT2015/000010
§ 371 (c)(1),
(2) Date: Oct. 14, 2015

(87) PCT Pub. No.: WO2015/109348
PCT Pub. Date: Jul. 30, 2015

(65) Prior Publication Data
US 2016/0115728 A1    Apr. 28, 2016

(30) Foreign Application Priority Data

Jan. 27, 2014 (AT) .................................. A 54/2014

(51) Int. Cl.
*B65G 45/00* (2006.01)
*E06B 3/673* (2006.01)
(Continued)

(52) U.S. Cl.
CPC ........... *E06B 3/67365* (2013.01); *B65G 15/42* (2013.01); *B65G 45/10* (2013.01); *E06B 3/67382* (2013.01)

(58) Field of Classification Search
CPC ...... B65G 15/42; B65G 45/10; E06B 3/67365
(Continued)

(56) References Cited

U.S. PATENT DOCUMENTS 4,422,541 A * 12/1983 Lisec ..................... B65G 17/26
198/626.5
4,589,541 A * 5/1986 Lisec ..................... B65G 17/26
198/468.4
(Continued)

FOREIGN PATENT DOCUMENTS

AT            384 096 B        9/1987
AT            384596 B        12/1987
(Continued)

OTHER PUBLICATIONS

Austrian Search Report, dated Oct. 2, 2014, from corresponding Austrian Application.
(Continued)

*Primary Examiner* — William R Harp
(74) *Attorney, Agent, or Firm* — Young & Thompson (57) ABSTRACT

Conveying elements (10) are used for moving insulation glass blanks (1) prior to, during and after sealing the blanks, the conveying elements (10) including supports (12) that support and move the insulation glass blank. The supports (12) on the conveying elements (10) are oriented relative to the insulation glass blank (1) in such a way that no supports (12) are in contact with the insulation glass blank in the region of corners (20) of the insulation glass blank (1), i.e. where sealing compound (2) can project from the outer periphery of the insulation glass blank (1).

13 Claims, 4 Drawing Sheets

(51) Int. Cl.
*B65G 15/42* (2006.01)
*B65G 45/10* (2006.01)

(58) Field of Classification Search
USPC ....... 198/494, 690.2, 698, 699; 700/95, 112, 700/114, 213–244
See application file for complete search history.

(56) References Cited

U.S. PATENT DOCUMENTS

| | | | |
|---|---|---|---|
| 5,280,832 A | | 1/1994 | Lisec |
| 5,332,080 A | | 7/1994 | Lenhardt et al. |
| 6,609,611 B1 | * | 8/2003 | Lenhardt .............. B65G 49/063 198/626.1 |

FOREIGN PATENT DOCUMENTS

| | | |
|---|---|---|
| AT | 396782 B | 11/1993 |
| DE | 28 16 437 B1 | 8/1979 |
| DE | 28 46 785 B | 12/1979 |
| DE | 83 18 401 U1 | 9/1983 |
| DE | 39 42 960 A1 | 10/1990 |
| WO | 92/05333 A1 | 4/1992 |

OTHER PUBLICATIONS

International Search Report, dated May 8, 2015, from corresponding PCT Application.

\* cited by examiner

METHOD FOR CONVEYING INSULATION GLASS BLANKS

BACKGROUND OF THE INVENTION

The invention relates to a method for conveying insulation glass blanks on supports of a conveying unit, with a lower edge of the insulation glass blank standing on at least two of the supports, and the supports being at a distance from the corners of the insulation glass blank, supporting and conveying the insulation glass blank.

DESCRIPTION OF THE RELATED ART

Horizontal conveyors that act on the lower edge of an insulation glass blank that is aligned essentially vertically are known. These conveying systems convey insulation glass blanks in order to deliver them to a sealing station while they are being sealed and in order to deliver sealed insulation glass blanks after sealing to further treatment or storage.

Another application of horizontal conveyors for insulation glass blanks or sealed insulation glass blanks is the conveyance of sealed insulation glass blanks after the sealing station in order to transfer them to another transport device that has a horizontal conveyor.

It is problematic in the conveyance of freshly-sealed insulation glass blanks and also when moving insulation glass blanks during the sealing that sealing compound fouls the conveying means of the horizontal conveyors, in particular when the sealing compound protrudes over the edge joints and, for example, overlaps the edges of the glass panes of the insulation glass blank. This can proceed so far that the sealing compound is pulled out of the edge joint again by the conveying means.

To convey insulation glass blanks during the sealing and to convey freshly-sealed insulation glass blanks, various devices have been proposed that are designed to avoid the aforementioned problems.

One proposal consists in forming conveying means that act on the lower edge of the insulation glass blank such that insulation glass sealing compound does not adhere to them, and therefore the parts of the conveying means acting on the insulation glass blank consist of an anti-adhesive material or can be coated with an anti-adhesive material. This has proven to be a less reliable measure, however.

Conveying means (horizontal conveyors) for insulation glass blanks have also been suggested that have L-shaped supports, as is known from, for example, AT 384 596 B and AT 396 782 B. These conveyors have proven effective. The problem is only when the sealing compound extends to over the edges of the glass panes of the insulation glass blank, since then the L-shaped supports also come into contact with the sealing compound and are fouled by it.

WO 92/05333 A discloses a conveyor device for insulation glass whose horizontal conveyor is made with V-shaped support surfaces, for which there are either V-shaped arranged conveyor belts or supports with V-shaped depressions so that the horizontal conveyors act solely on the outer edges of the glass panes of the insulation glass blank. The disadvantage in this known conveyor device is that the sharp edges of the glass panes quickly wear down the conveying means.

A horizontal conveyor for insulation glass blanks with two conveyor belts that are located next to one another is also known. The conveyor belts are at a distance from one another that corresponds to the width of the spacer in the insulation glass blank so that the insulation glass blank stands only with the lower edges of the glass panes on the conveyor belts of the conveyor device. This conveyor apparatus can also be suitable for the conveyance of so-called stepped elements (one glass pane of the insulation glass blank is smaller than the other) since the conveyor belts can be raised or lowered independently of one another.

DE 28 46 785 B discloses a sealing device whose conveyor belts are outfitted with nub-shaped supports. This reduces the probability of fouling in comparison to conveyor belts without supports, but it can occur again and again that conveyor belts that have been outfitted with nubs come into contact with the sealing compound, especially in corner regions of insulation glass blanks, since the sealing in the corner region can often protrude above the outer periphery of the insulation glass blank.

DE 39 42 960 A discloses a device for conveying insulation glass panes that have been cemented to one another on the edge. The known device has a horizontal conveyor that has an endless conveyor member that is routed around deflection wheels with a roughly horizontal axis of rotation and on which there are supports for the lower edge of the insulation glass panes, and a support device that is located above the horizontal conveyor and that extends parallel to it for lateral support of the insulation glass panes standing on the supports. The supports have a gable roof-shaped top with a ridge that runs transversely to the conveying direction and consist of aluminum or of a material with similarly low hardness such as aluminum, and underneath the conveyor member, there is a cleaning device for the supports on the lower strand of the conveyor member.

A similar device is known from DE 28 16 437 B.

Both DE 39 24 960 A and also DE 28 16 437 B show situations in which the supports are located on the horizontal conveyor at a distance from corners of the insulation glass pane, as well as situations in which supports act on the corners of the insulation glass pane. Measures to prevent the latter situation have not been disclosed.

SUMMARY OF THE INVENTION

The object of the invention is to improve the conveyance of insulation glass blanks such that the risk of fouling of the conveying means is greatly reduced, if not eliminated.

Since, in the method according to the invention, the procedure is such that supports are positioned on the conveying means such that they do not act on the insulation glass blank in a region in which sealing compound can protrude above the outer periphery of the insulation glass blank (these are especially corner regions), the risk that in the method according to the invention, supports of the conveying means will come into contact with the sealing compound and will be fouled in doing so is greatly reduced, if not prevented.

The method according to the invention can be used in a sealing station or else there are conveying means that are provided after the sealing station and that are used according to the method according to the invention.

If conveying means are provided in a sealing station using the method according to the invention, generally there are two conveying means between which there is an interruption in which a sealing nozzle is arranged and is used for sealing the lower section of the edge joint. When using the method according to the invention for two conveying means, the procedure is such that their supports do not come into contact with the corner regions of the insulation glass blanks.

The supports according to the invention that can be designed in the manner of small benches can be made in the shape of a cylindrical section (shape of a saddle of venison), cuboidal or with a concave action surface, i.e., a surface that acts on the insulation glass blank. For concave action surfaces, they are made sunken in a V-shape so that the supports act only on the outer edges of the glass panes of the insulation glass blank.

Within the scope of the invention, supports can be used that consist of a material to which the sealing compound does not adhere or adheres only slightly, or else the supports are coated with such a material.

The supports can be shapings (in regions, thickenings or protuberances) of a conveyor belt of the conveying means, or else supports are connected to the conveyor belt of the conveying means, for example cemented, screwed to them, or slipped onto them.

Within the scope of the invention, consideration is given to using supports that are detachably fastened to the conveyor belt of the conveying means so that they can be alternated, and the distance of the supports from one another can be changed by adding or removing supports.

Within the scope of the invention, consideration is also given to configuring conveying means with two conveyor belts that can be adjusted in varying vertical alignment so that stepped elements can be transported.

For the transport of stepped elements, stepped supports can also be used, the dimensions of the stepped supports being chosen such that they correspond to the dimensions of the step of the insulation glass blank. To do this, for example, it can be provided that in each case, those stepped supports are attached to the conveyor belt of the conveying means that correspond to the dimensions of the step of the insulation glass blank.

Within the scope of the invention, in general a conveying means is used that is provided with supports that ensure sufficient frictional engagement for slip-free transport of the insulation glass blank. In particular, when the insulation glass blank is to be sealed, it can be necessary for uniform and controlled movements of the insulation glass blank to add additional conveying means (carriers, conveyor belts, suction boxes or suction belts that act on a large area of the insulation glass blank, etc.) that become active in the method according to the invention in addition to the conveying means of the horizontal conveyor.

If, in the method according to the invention, the conveying means have at least one endless conveyor belt on which there are supports, cleaning devices in the form of brushes or the like can be assigned to the strand of the conveyor belt that is not exactly necessary for the support of the insulation glass blank, i.e., the lower strand. These brushes or the like can be, for example, rotary-driven round brushes.

Within the scope of the invention, consideration is given to proceeding such that supports are removed from the conveying means, for example the lower strand of a conveyor belt, optionally mechanically, and are added again after cleaning, optionally mechanically.

In one embodiment of the method according to the invention, it is provided that the start and end (viewed in the conveying direction) of an insulation glass blank are to be aligned (positioned) relative to the supports on the conveying means that is accepting the insulation glass blank such that fouling of the supports of the conveying means by sealing compound is avoided by proceeding such that corner regions of a sealed insulation glass blank do not come into contact with a support of the conveying means.

For this purpose, for example, it is possible to proceed such that the location of the start of an insulation glass blank is detected using a photoelectric barrier or is determined from known parameters of the size of the insulation glass blank. In exactly the same way, the end of the insulation glass blank is determined from a measurement or from the initial position and feed rate. Based on the positions of the (lower) corners of the insulation glass blank that have been detected in this way, the supports on the conveying means that is to accept the insulation glass blank are moved such that they do not act on the insulation glass blank in the region of one of its corners. In doing so in one embodiment, it is sufficient if solely the position of one support on the conveying means is known. This is especially simple when the supports according to one exemplary embodiment on the conveying means are at the same distances from one another.

The movement of the supports in order to allow them to act on the insulation glass blank at a distance from the corners of the insulation glass blank can take place by accelerating or decelerating the conveying means onto which the insulation glass blank is to be transferred or by accelerating or decelerating the conveyor unit from which the insulation glass blank is being accepted.

In one exemplary embodiment of the method according to the invention, the procedure is such that distances of supports on the conveying means are changed.

In one exemplary embodiment of the method according to the invention, the procedure is such that distances of supports on the conveying means are changed by adding supports to the conveying means and/or removing supports from the conveying means.

In one exemplary embodiment of the method according to the invention, the procedure is such that distances of supports on the conveying means are changed by using a conveying means that encompasses two conveyor belts, on the conveyor belts there being supports arranged overlapping the respective other conveyor belt and such that the relative location of the conveyor belts to one another is changed.

In one exemplary embodiment of the method according to the invention, the procedure is such that supports are removed for cleaning the conveying means and cleaned supports are re-attached to the conveying means.

In one exemplary embodiment of the method according to the invention, the procedure is such that a conveying means is used that has two conveyor belts that can be aligned in different vertical positions with supports in order to convey insulation glass blanks in the form of stepped elements.

In one exemplary embodiment of the method according to the invention, the procedure is such that the conveyance of insulation glass blanks is supported by additional conveying systems that act on the insulation glass blank, such as suction boxes, negative pressure conveyor belts, mechanical carriers, and the like.

In one exemplary embodiment of the method according to the invention, the procedure is such that a conveying means is used whose supports are at distances from one another that correspond essentially to twice the length of the region in which sealing in the region of one corner of the insulation glass blank protrudes above the edge of the insulation glass blank.

Within the scope of the invention, conveying means are preferably used that are made as conveyor belts in the form of toothed belts. In addition, conventional belt conveyors with supports, perforated metal strips with supports whose holes engage in pins that are attached to deflection pulleys, or articulated belts are also considered.

Within the scope of the invention, conveying means are preferably used whose supports are at the same distances from one another, the distances, for example, being essentially twice the length of the region on the corner of an insulation glass blank in which sealing compound can protrude above the periphery of the insulation glass blank.

Within the scope of the invention, consideration is also given to using conveying means whose supports are at different distances from one another.

By advance in the empty state of the conveying means, the conveying means can be aligned (moved) such that the location of the supports is matched to the insulation glass blank that is to be accepted from the conveying means, and they come into contact with corner regions of the insulation glass blank.

Within the scope of the invention, it is preferred that conveying means be used that have as few supports as possible in order to keep the risk of fouling low.

If, within the scope of the invention, conveying means are to be used in which the distances of the supports from one another are different, for example can be changed, this can be effected by supports being removed from the conveying means or a conveying means being attached.

Consideration is given to one embodiment using a conveying means that comprises two endless conveyor belts that are synchronously driven and whose relative location to one another, however, can be adjusted. Here, it is provided that the supports on each of the conveyor belts overlap the conveyor belt that is located next to it. By changing the relative location of the conveyor belts to one another, the distance of the supports from one another can be matched to the respectively desired and necessary circumstances.

One advantage of the method according to the invention is that when an insulation glass blank is being accepted by a conveying means with supports, an impact or blow that would be applied by the striking of the insulation glass blank against a support is avoided.

The conveying means according to the invention can be designed as an endless conveyor belt with supports.

Consideration is also given, however, to executing the conveying means as a chain, it being considered to withdraw individual supports from their action position in order to prevent their coming into contact with the insulation glass blank in the region of one of its corners.

One advantage of the method according to the invention is that oblique fractures on the corners of the glass panes are avoided since none of the system parts (supports) that support the insulation glass blank act there. This is also associated with the advantageous effect that the wear and tear on the conveying means can be kept low.

One advantage of the conveying means used according to the invention is also that differently than, for example, the conveying means of AT 384 096 B, they need not be adapted to the thickness of the insulation glass blank or insulation glass.

BRIEF DESCRIPTION OF THE DRAWING FIGURES

Other details and features of the method according to the invention will become apparent from the following description with reference to the attached drawings. Here.

DETAILED DESCRIPTION OF THE INVENTION

Figures 1, 2:
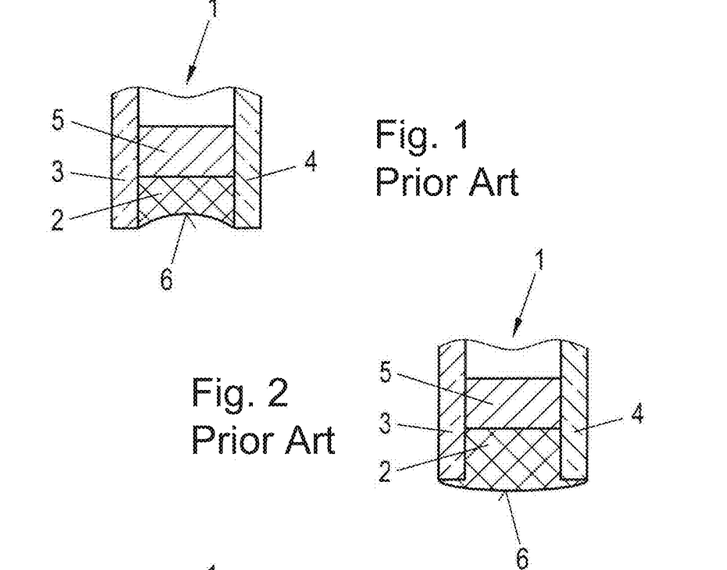
FIG. 1 shows the ideal case of sealing an insulation glass blank.
FIG. 2 shows sealing compound protruding above the periphery of the insulation glass blank, in particular in the corner region of an insulation glass blank.

In a partial view of a section through a two-pane insulation glass 1, FIG. 1 shows the ideal form of a sealing 2. In this ideal form, the sealing compound in the edge joint, which is bordered laterally by the edges of the glass panes 3 and 4 and to the inside by the spacer 5, is filled with sealing compound such that it does not protrude above the inner borders of the edges of the glass panes 3 and 4, and preferably has a concave outer surface 6.

FIG. 2 shows how a sealing 2 in particular in the region of corners of the insulation glass 1 has a convex outer surface 5, i.e., protrudes above the peripheral edge of the insulation glass 1 and also overlaps the edges of the glass panes 3 and 4.

Figure 3:
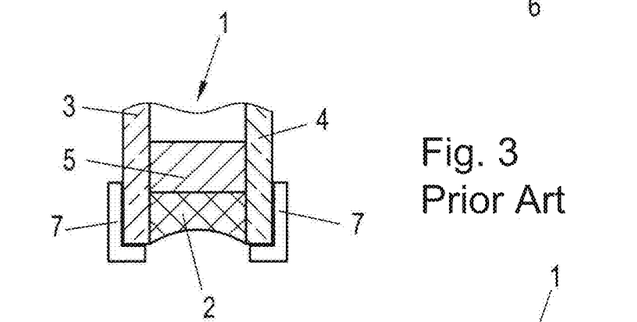
FIG. 3 shows a known embodiment of a conveying means for insulation glass blanks.

FIG. 3 shows an embodiment, known in the art, of a conveying means for the transport of sealed insulation glass blanks, as is known from, for example, AT 384 596 B. In this known conveying means, there are hook-shaped supports 7 that are mounted on endless chains (not shown) and that extend under solely the outer sides of the edges of the glass panes 3 and 4 of insulation glass 1.

Figure 4:
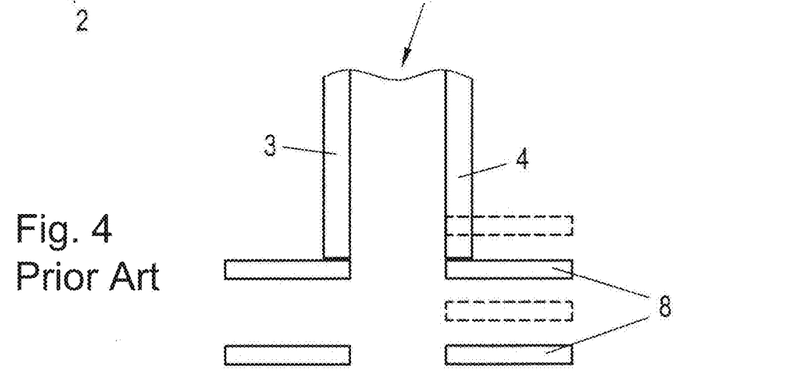
FIG. 4 shows a conveying system (known) for insulation glass blanks with two conveyor belts that are located next to one another, FIG. 5 schematically shows a part of a conveying means that can be used according to the invention.

FIG. 4 shows another embodiment of a known conveying means that has two conveyor belts 8 that are separate from one another and that extend under the edge of the glass panes 3 and 4 of the insulation glass and—as shown by the broken line—can be aligned in different vertical positions for the transport of stepped elements.

Figure 5:
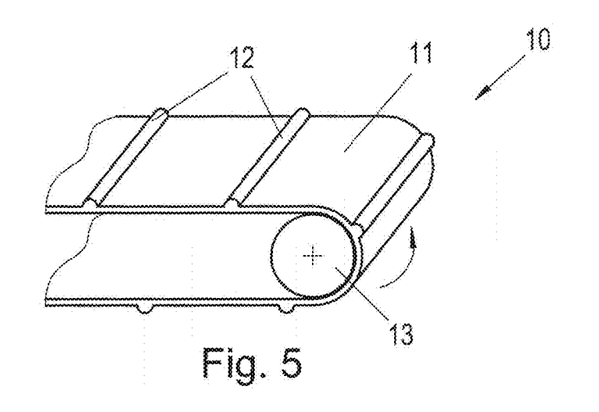

In a partial view, FIG. 5 shows a conveying means 10 that is designed as an endless conveyor belt 11. The conveyor belt 11 can be a toothed belt so that there is a good connection between the driving deflection pulleys 13 and the conveyor belt 12. As FIG. 5 shows, on the conveyor belt 11, there are supports 12 that are designed as ribs ("small benches") that are aligned transversely to the longitudinal extension of the conveyor belt 11.

Figure 7:
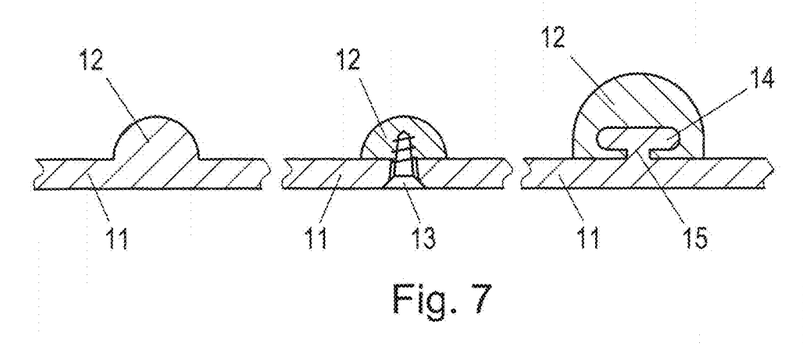
FIG. 7 shows different embodiments of supports on conveying means according to the invention.

FIG. 7 shows that the supports 12 with the conveyor belt 11 can be one-piece shapings of the conveyor belt 11, i.e., local thickenings of the latter. Alternatively, as shown in the middle sketch of FIG. 7, the supports 11 can be connected by screws 13 or other fasteners to the endless member of the conveyor belt.

Another possibility that is shown in FIG. 7 for connecting supports 12 to the conveyor belt 11 is that the support 12 on its side facing the conveyor belt 11 has an undercut groove 14 with which it can be pushed over a strip 15 of the conveyor belt 11, which strip is profiled in diametrical opposition.

The two latter embodiments make it possible to remove supports 12 from the conveyor belt 11 of the conveying means 10 that is used according to the invention or else to attach additional supports 12. Thus, the distances between adjacent supports 12 can be changed (increased/decreased).

The supports 12 can, as indicated in FIGS. 5 and 7, be ribs that are half-round in cross-section. The generating lines of the envelope surface of the rib-shaped supports 12 according to FIGS. 5 and 7 are straight. In modified embodiments, the supports 12 can have concavely-curved generating lines and, for example, can be designed essentially V-shaped, as is known in principle from WO 92/05333 A.

Within the scope of the invention, consideration is given to assigning devices for cleaning supports 12 to the lower strand of the conveyor belt 12 of conveying means 10 used according to the invention so that if need be, adhering sealing compound is removed from them. These cleaning devices can be brushes, rotationally-driven round brushes being considered (compare WO 92/05333A).

Figure 6:
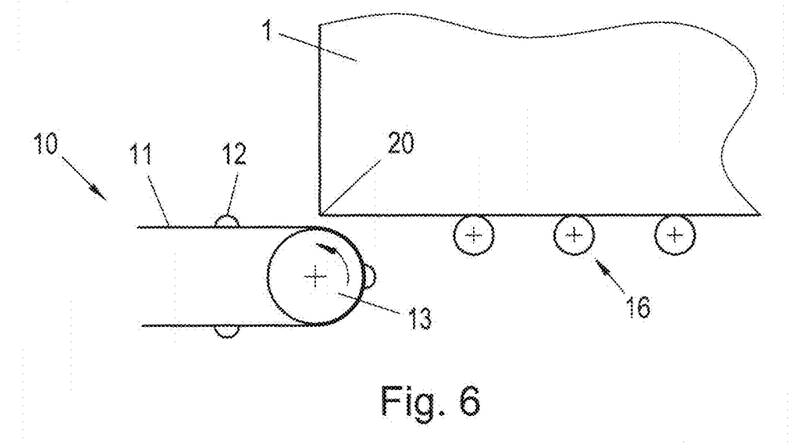
FIG. 6 shows the assignment of the insulation glass blank to a conveying means in the execution of the method according to the invention.

FIG. 6 shows how an insulation glass blank 1 that is being delivered on a roller conveyor 16 coming from the right of FIG. 6, for example from an assembly station in which insulation glass blanks of glass panes 3, 4 and spacers 5 are assembled, is accepted from a conveying means 10 according to the invention. It is apparent that the movements of the insulation glass blank 1, on the one hand, and of the conveying means 10, on the other hand, are matched to one another such that in the region of the corner 20 of the (sealed) insulation glass blank, i.e., where the sealing can appear as is shown in FIG. 2 and protruding above the periphery of the insulation glass blank 1 in regions, a support 12 does not act directly on the insulation glass blank 1.

Figure 8:
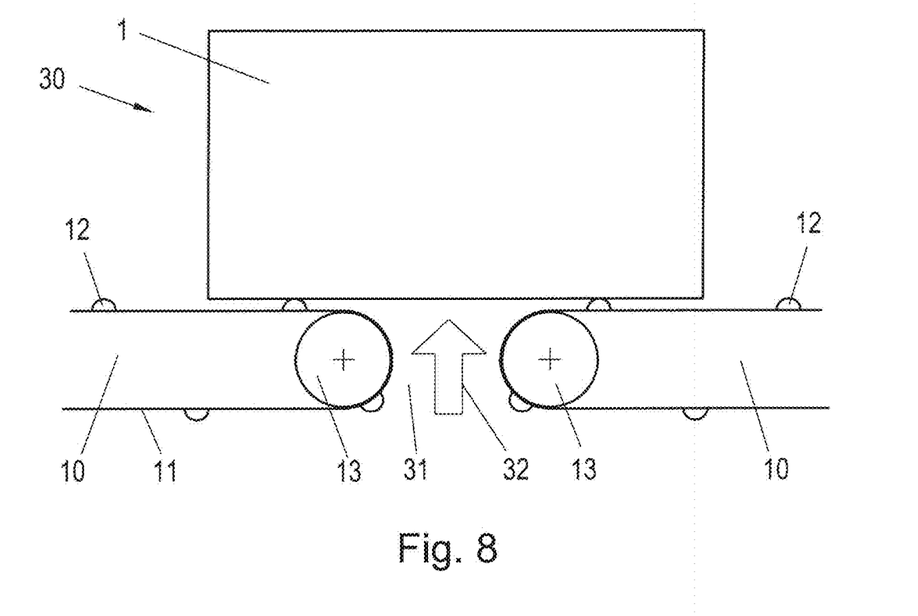
FIG. 8 shows the arrangement of conveying means in a sealing station.

FIG. 8 shows the situation in a sealing station 30, two conveying means 10 with conveyor belts 11 that are outfitted with supports 12 being used, and in the gap 31 between the two conveying means 10 there being a sealing nozzle 32 that is indicated by an arrow. It is shown in FIG. 8 that supports 12 of the conveying means 10 used according to the invention do not act in the region of the corners 20 of the insulation glass blank 1 so that there is no risk that conveying means 10, their conveyor belts 11 and/or their supports 12 will be fouled by protruding sealing 2 (FIG. 2).

Figure 9:
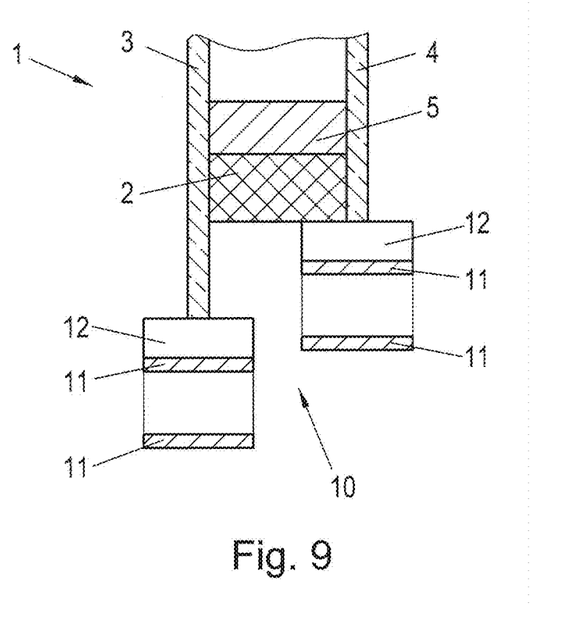
FIG. 9 shows the application of a method according to the invention in stepped elements.

FIG. 9 shows one embodiment in which the conveying means 10 used according to the invention comprises two continuous conveyor belts 11, which are separate from one another, with supports 12, which can be aligned in different vertical positions. This makes it possible, using the method according to the invention, to transport stepped elements, i.e., insulation glass blanks 1 with glass panes 3, 4 of different sizes, such that supports 12 do not act on the insulation glass blank 1 in the corner region.

Figure 10:
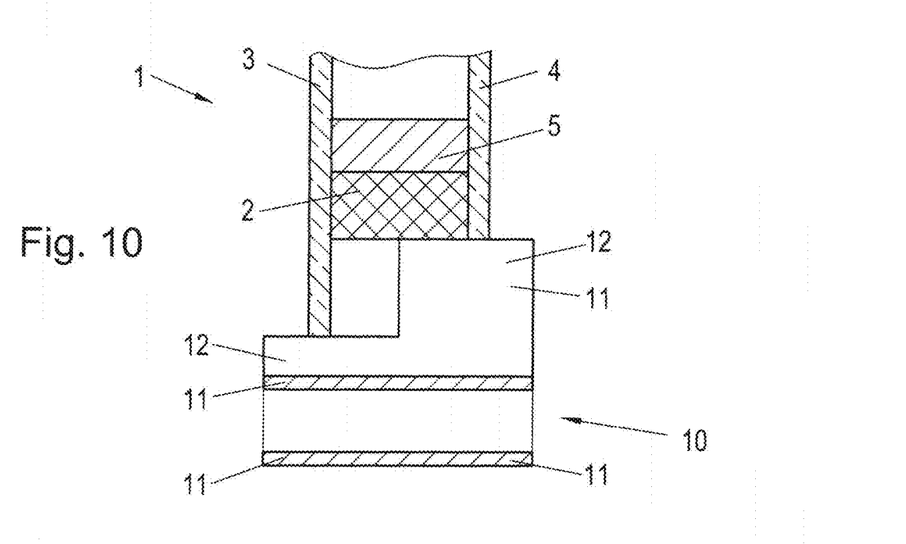
FIG. 10 shows a variant of the application of the method according to the invention in stepped elements.

FIG. 10 shows another embodiment of a conveying means 10 that can be used within the scope of the invention in which on the endless conveyor belt 11 of the conveying means 10, there are L-shaped supports 12 that allow the transport of stepped elements using the method according to the invention.

It is considered within the scope of the invention that the distances from the supports 12 to the conveyor belt 11 of the conveying means 10 are matched to the respectively prevailing conditions, especially the size of the insulation glass blank 1 and the like. This can easily take place by supports 12 being attached to the conveyor belt 11 of the conveying means 10 where they are needed.

Figure 11:
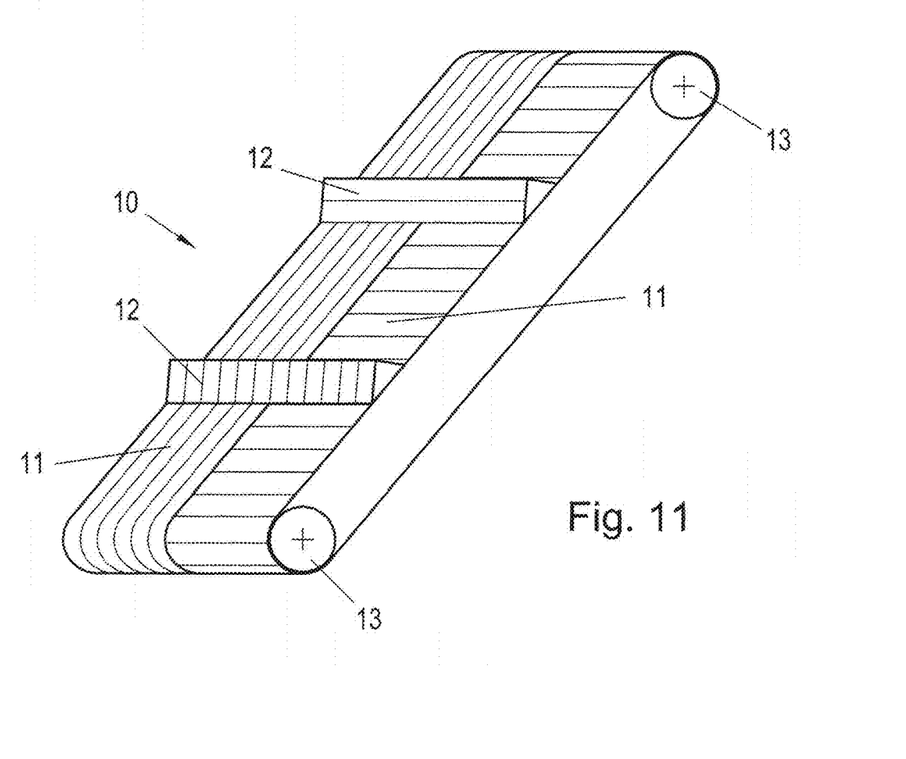
FIG. 11 shows a conveying means that can be used within the scope of the invention with supports whose distances from one another can be changed.

FIG. 11 schematically shows one embodiment that makes it possible to change the distances between supports 12. In this embodiment, the conveying means 10 used according to the invention comprises two endless conveyor belts 11 that are located next to one another. On each of the conveyor belts 11, supports 12 are fastened that protrude above the other adjacent conveyor belt 11, but are not fastened to it.

FIG. 11 shows that one support 12 that is identified by longitudinal crosshatching is attached only to the conveyor belt 11 that is the left one in FIG. 11 and the other support 12 that is identified by transverse crosshatching is attached only to the conveyor belt 11 that is the right one in FIG. 11. This embodiment of a conveying means 10 makes it possible to change the distances of the supports 12 from one another by relative adjustment of the two conveyor belts 11 to one another. If the conveying means 10 that is shown in FIG. 11 is used to transport insulation glass blanks 1, the two conveyor belts 11 are driven synchronously.

Within the scope of the invention, consideration is given to supporting the transport of insulation glass blanks 1 before, during, and after sealing by a conveying means 10 used according to the invention with supports 12 by additional conveying systems that are moved synchronously with the conveying means. These additional conveying systems can be suction boxes that are designed as carriers and that are moved synchronously to the movement of the conveying means 10 and act laterally on one of the glass panes 3 or 4 of the insulation glass blank 1.

Alternatively, there can be suction belts that are supplied with negative pressure or simply mechanical carriers that act on one of the vertical edges of the insulation glass blanks 1.

In this case, the additional conveying system takes over the movement (the feed) of an insulation glass blank 1 at least for the most part, and the conveying means 10 provided according to the invention with the supports 12 accommodates the weight (or at least most of the weight) of the insulation glass blank 1.

Conveying means 10 with supports 12, in particular conveying means 10 with conveyor belts 11 that have supports 12 (FIGS. 5-7 and 11), also have the advantage that systems for removing insulation glass blanks 1 or insulation glass, for example from a sealing station, can extend under insulation glass blanks 1 or insulation glass since between the lower edge of the insulation glass blank 1 or of the insulation glass and the conveyor belt 11, there is empty space due to the supports 12.

In summary, one embodiment of the invention can be described as follows:

When the insulation glass blanks 1 are moving before, during, and after their sealing, conveying means 10 with the supports 12 that move and support the insulation glass blanks are used. The supports 12 on the conveying means 10 are aligned relative to the insulation glass blank 1 such that in the region of corners 20 of the insulation glass blank 1, i.e., where sealing 2 can protrude above the outer periphery of the insulation glass blank 1, supports 12 do not adjoin the insulation glass blank.

The invention claimed is:

1. A method for conveying an insulation glass blank (1), the method comprising:
   using a conveying unit (10) comprised of at least one conveyor belt (11) having an outside surface that bears supports (12);
   delivering the insulation glass blank (1) at a first speed of movement to the conveying unit (10) running at a second speed of movement, so that the conveying unit (10) accepts a lower edge of the insulation glass blank (1) standing on the at least two supports (12) such that the at least two supports (12) are at a distance from first and second corners (20) of the insulation glass blank (1); and supporting and conveying the insulation glass blank (1) standing on the at least two supports (12) of the conveying unit (11), wherein the delivering step includes:

i) detecting a position of the first corner (20) of the insulation glass blank (1) moving at a first speed of movement, and ii) adjusting a relative movement between the insulation glass blank (1) and the conveying unit (10) by selecting a difference between the first speed of movement of the insulation glass blank (1) and the second speed of movement of the conveying unit (10), such that the at least two supports (12) are located at the distance from the first and second corners (20) of the insulation glass blank (1) when the lower edge of the insulation glass blank (1) is accepted by the conveying unit (10).

2. The method according to claim 1, comprising the further step of cleaning the supports (12) while the supports (12) are at a spaced-apart distance from the insulation glass blank (1).

3. The method according to claim 2, wherein the supports (12) are selected to comprise a material having an adhesion less than an adhesion of a sealing compound.

4. The method according to claim 2, wherein in the supporting and conveying step, the at least one conveyor belt (11) is routed via deflection pulleys (13).

5. The method according to claim 2, wherein the supports (12) are selected to comprise an outer surface covered with a material having an adhesion less than an adhesion of a sealing compound.

6. The method according to claim 1, wherein the supports (12) are selected from the group consisting of rib-shaped supports, cuboidal supports, and L-shaped supports with a concave action surface.

7. The method according to claim 1, wherein the supports (12) are selected to comprise a material having an adhesion less than an adhesion of a sealing compound.

8. The method according to claim 1, wherein the supports (12) are selected to be protuberances on the at least one conveyor belt (11).

9. The method according to claim 1, wherein the supports are detachable supports and comprising the further step of attaching the supports (12) to the at least one conveyor belt (11).

10. The method according to claim 1, wherein in the supporting and conveying step, the at least one conveyor belt (11) is routed via deflection pulleys (13).

11. The method according to claim 10, wherein the at least one conveyor belt (11) comprises a lower strand and comprising the further step of cleaning the supports (12) when the supports are located on the lower strand.

12. The method according to claim 1, comprising the further step of changing a speed of movement of the at least one conveyor belt (11).

13. The method according to claim 1, wherein the supports (12) are selected to comprise an outer surface covered with a material having an adhesion less than an adhesion of a sealing compound.

* * * * *